3,558,345
FLUOROCARBON RESIN TO GLASS BONDING
George Baum, Corning, and John G. Koelling, Big Flats, N.Y., assignors to Corning Glass Works, Corning, N.Y., a corporation of New York
No Drawing. Filed Mar. 7, 1968, Ser. No. 711,207
Int. Cl. C03c 17/32
U.S. Cl. 117—54                   14 Claims

ABSTRACT OF THE DISCLOSURE

Method of bonding a fluorocarbon resin to the surface of a silicate glass having free, available silanol groups by means of an intermediate amino-functional silane coupling agent and the product formed thereby.

---

Fluorocarbon resins, commercially available under the trademark Teflon, are known for their chemical inertness and for their ability to provide a lubricating protective coating to many materials. In forming coatings or films of fluorocarbon resins onto a substrate, normal bonding techniques are ineffective since these resins are inert to most known adhesives. Thus, special procedures have been developed. The most common one involves melting the resin on a substrate which has been roughened by, for example, sand blasting or chemical etching. The molten resin flows around and into the roughened surface and upon solidification the resin is anchored mechanically to the substrate. Unfortunately, in some instances, especially in making tools or utensils having sharp non-sticking edges, the roughening of the surface detrimentally affects the cutting characteristics of the article.

Another method of bonding a fluorocarbon resin to a material involves the reaction between the resin and alkali metals whereby fluorine atoms are extracted from the carbon chain. Several adhesives, especially epoxy resins, can then be bonded to the degraded film. However, again for those applications where sharp edges are desired, the coating operation and the necessity for a very thin coating with an undegraded exposed surface make this method impractical.

In accordance with the present invention we have discovered a method of bonding a fluorocarbon resin to the surface of a silicate glass by cleaning the glass surface to prepare it for bonding, treating the cleaned surface with an amino-functional coupling agent, applying the fluorocarbon resin to the treated glass and then curing the resin at elevated temperatures. The product prepared by our method, a glass substrate and a fluorocarbon resin bonded to the glass surface through an intermediate amino-functional coupling agent, is also unique.

It is generally desirable that the glasses, to which the fluorocarbon resin is bonded, be durable and have a non-porous surface. The glass must be a silicate glass having free, available silanol groups. The preferred glass substrates are aluminosilicate and borosilicate glasses. A glass composition which does not work well following the procedure of our method in soda lime glass, since it is not durable and subject to attack by moisture. The use of coupling agents on phosphate or borate glasses was found to be ineffective and failed to produce satisfactory bonding. Glasses which are not durable to the conditions to which they are exposed during treatment will not have good adhesion to the fluorocarbon resin. In these glasses failure does not occur at the bond between the coupling agent and the glass, but a surface layer of the glass separates from the glass body.

The initial step in the process involves preparing the surface of the glass for bonding. Cleaning of the glass surface is conventional, with the exception that it will vary to some extent with the particular glass being used as a substrate. For example, borosilicate and aluminosilicate glasses can be cleaned at high temperatures of 500° C. to oxidize any organic matter present. More typically, organic matter is oxidized by using a concentrated (about 50%) nitric acid solution at temperatures about 80–100° C. After treating the glass with nitric acid, it should be washed in distilled water and dried typically using acetone which gives a superficial drying, but does not remove all the water.

Another convenient method for cleaning borosilicate and aluminosilicate glasses is to use a concentrated 50% hydrofluoric acid-50% sulfuric acid solution at room temperatures. For calcium aluminosilicate glasses the reaction products should be removed in nitric acid by, for example, alternating between dipping the glass in the hydrofluoric acid bath and a nitric acid bath. It may further be desirable after the hydrofluoric acid bath treatment to further rinse the glass in hot nitric acid at a temperature of about 80–100° C. and then rinse in boiling water.

When the glass substrate is particularly dirty, it is initially washed in a hot detergent solution at temperatures up to boiling. The glass is rinsed with water and then placed in a nitric acid solution to oxidize any of the soap solution left on the surface of the glass. After the glass substrate has been cleaned, it should be kept clean until the coupling agent has been applied to the surface.

After the glass substrate has been cleaned, it should be dried to remove surface water and to leave the surface with free silanol groups. Drying may be accomplished by heating the glass at elevated temperatures, such as for example, by placing the glass in an oven at 100° C. for about 24 hours or at 400° C. for 15 minutes. The oven atmosphere must remain free of organic material which could react with the surface silanol groups. Thereafter the glass should be stored under such conditions that the silanol groups are ready for bonding.

The second step of the process involves treating the cleaned and dried glass substrate with the amino-functional silane coupling agent. Coupling agents useful herein contain one terminal portion which is reactive with the silanol groups on the glass surface and a second terminal portion which contains a functional amino group which is capable of coupling to the fluorocarbon resin. The amino groups may be a primary or secondary amine. More specifically, typical coupling agents are amino-functional aliphatic silanes such as N-beta-aminoethyl-gamma-aminopropyl trimethoxysilane, N-beta-aminoethyl-(alpha-methyl-gamma-aminopropyl)-dimethoxymethylsilane, and gamma-aminopropyl-triethoxysilane. The coupling agent is applied to the glass substrate from a solvent solution. Only the higher boiling aromatic and aliphatic solvents have been shown to be useful. Particularly good solvents are toluene, benzene, xylene, and high boiling hydrocarbons. While the silane coupling agents are soluble in alcohol and water, these should be avoided because they interfere with good bonding of the fluorocarbon resin. Also, aldehydes, ketones, acids, esters, or alkyl chlorides should be avoided as solvents because these tend to react with the silanes.

In applying the silane coupling agent from a solvent solution, it is necessary to provide some means to react the methoxy end of the molecule. This is accomplished by heating the solution to temperatures of between about 60–140° C. In a preferred method of the present invention, the silane coupling agent is dissolved in toluene in concentrations of about 0.1–5.0% by weight. The optimum solution is about 1%. Generally, solutions over 5% coupling agent tend to leave too thick a film on the surface of the glass which subsequently interferes with bonding. When the solution contains less than a tenth of a percent, there may not be enough coupling agent in the solution and consequently poor bonding results. In general, there should always be a sufficient amount of coupling agent in the solution to form a coating on the surface of the glass substrate.

The solution of the coupling agent may be applied by either a dipping technique or by treating the glass substrate with the solution of the coupling agent at elevated temperatures such as under refluxing conditions. Using the dipping technique, the glass substrate is placed in a dilute solution of the coupling agent for about five minutes up to about four hours. This is generally found to be quite effective. However, it is preferred to use the refluxing technique, such as for example, refluxing in a toluene solution which boils at about 105° C. Refluxing may be from about 1–16 hours with usually four hours being quite effective. For most applications, one hour at refluxing temperature is satisfactory.

It is now that the fluorocarbon resin is applied to the surface of the treated glass. In one procedure, a solid sheet of the resin is applied directly to the glass substrate or sandwiched between two pieces of glass at elevated temperatures. The temperatures will vary to some extent depending upon the type of fluorocarbon resin being used. Two common types of fluorocarbon resins available are Teflon TFE fluorocarbon resin (tetrafluoroethylene) and Teflon FEP fluorocarbon resin (fluorinated ethylene propylene) which vary to some extent in their physical properties. Both of these resins are chemically inert to essentially all industrial chemicals and solvents even at elevated temperatures and pressures. The chemical inertness of fluorocarbon resins may be explained by the fact that there is very strong interatomic bonds between carbon-carbon and carbon-fluorine atoms, the almost perfect shielding of the polymer's carbon backbone by fluorine atoms, and the very high molecular weight of the resin compared with many other polymers.

Another way of applying a coating of the fluorocarbon resin to the treated glass is by means of an aqueous dispersion of the fluorocarbon resin. For example, a particularly effective dispersion is available from E. I. du Pont under the designation Teflon TE–3170 dispersion. A desirable property of this material is that the resin is in the form of very small particles between 0.1–0.2 micron in diameter. Thus, in coating applications, extremely thin films to less than 0.5 mil per coat of the resin can be obtained. The dispersion is applied by conventional techniques such as by general coating, drying and sintering procedures. Another example of a dispersion which can be used is Teflon 120 FEP fluorocarbon resin dispersion which is applied by repetitive dip or spray coating to the silicate glass treated with the coupling agent. The coating is then dried at about 90–120° C. and the wetting agent is volatilized at about 260° C.

Finally, the fluorocarbon resin is subjected to a curing or sintering procedure. The upper curing temperatures will to some extent vary depending upon whether the TFE fluorocarbon resin or the FEP fluorocarbon resin is being used. The FEP resin is preferably cured at temperatures of 340–360° C. for 60–75 minutes. The temperatures can be varied to some extent such that at higher temperatures shorter times should be used whereas lower temperatures require a longer period of time. In comparison, the TFE resin requires higher curing temperatures and/or longer times. However, both fluorocarbon resins have an upper curing temperature which should not exceed about 400° C. At higher temperatures these resins tend to degrade rapidly.

Our invention is further illustrated by the following examples.

EXAMPLE I

Six bars of an aluminosilicate glass were ground to the dimensions 7/32" x 7/32" x 1¼". The aluminosilicate glass used was Code 1723 (Corning Glass Works) having the following composition.

| Ingredient: | Percent by weight |
|---|---|
| $SiO_2$ | 58 |
| $Al_2O_3$ | 15 |
| CaO | 10 |
| MgO | 7 |
| BaO | 6 |
| $B_2O_3$ | 4 |

The bars of glass were then cleaned by dipping alternately in a concentrated 50% hydrofluoric acid-50% sulfuric acid solution and a 50% hot nitric acid solution. The bars were boiled in distilled water for one half hour and then dried in a furnace for one half hour at 360° C.

Thereafter the cleaned bars of glass were treated under refluxing conditions with a 1% (dried) toluene solution of gamma-aminopropyl-triethoxysilane (A–1100 manufactured by Union Carbide) for 16 hours. The bars were washed with acetone and placed in an oven for one half hour at a temperature of 120° C.

A piece of Teflon FEP fluorocarbon resin ¼ inch square and 5 mils thick was washed with chloroform. The fluorocarbon resin was then sandwiched between two bars of treated glass placed at right angles to each other. A 14 gram weight was placed on the top bar to maintain the sandwiched laminates together. The composite was then placed in a furnace at 360° C. and cured for 1 hour. Thereafter, the laminates were removed from the furnace and cooled.

The tensile strength of the fluorocarbon resin-glass laminate was determined. Three samples which were prepared gave the results of 2,228 p.s.i., 2,172 p.s.i. and 2,124 p.s.i.

EXAMPLE II

Following the procedure of Example I, six bars of a borosilicate glass were ground to the dimensions of 7/32" x 7/32" x 1¼". The borosilicate glass used was Code 7740 (Corning Glass Works) having the following composition.

| Ingredient: | Percent by weight |
|---|---|
| $SiO_2$ | 80.0 |
| $B_2O_3$ | 13.8 |
| $Na_2O$ | 4.3 |
| $Al_2O_3$ | 1.9 |

The bars of glass were then cleaned by dipping alternately in a concentrated 50% hydrofluoric-50% sulfuric acid solution and a 50% hot nitric acid solution. The bars were boiled in distilled water for one half hour and then dried in a furnace for one half hour at 360° C.

Using the same procedure as set forth in Example I, the bars were treated under refluxing conditions with a 1% solution of gamma-aminopropyl-triethoxysilane coupling agent in toluene and then laminates of glass-fluorocarbon resin-glass were prepared. Tests of the tensile strength of the laminates were 2,176 p.s.i. and 1,964 p.s.i. respectively.

EXAMPLE III

Following the procedure of Example I and using the borosilicate glass of Example II, glass-fluorocarbon resin-glass laminates were prepared. Initially the glass bars were cleaned in a boiling detergent solution and then subjected to a hot 50% nitric acid solution. The bars were then rinsed in distilled water and dried for one half hour in a furnace of 360° C. The cleaned glass bars were refluxed for four hours in a 1% toluene solution of N-beta-aminoethyl - gamma - aminopropyl-trimethoxysilane (Dow Corning Z–6020 silane).

The bars were removed and rinsed with acetone and stored for 16 hours in acetone. They were then dried in an oven at a temperature of 120° C. for one half hour. A 5 mils thick piece of Teflon FEP fluorocarbon resin was sandwiched between two bars of the glass and then cured at a temperature of 360° C. for 75 minutes. The tensile strength of the resulting laminates were 2,030 p.s.i., 1,644 p.s.i. and 2,194 p.s.i.

EXAMPLE IV

Following the procedure of Example III with the exception that the borosilicate glass bars were treated with a 1% toluene solution of N - beta - aminoethyl - (alpha-methyl - gamma - aminopropyl) dimethoxymethylsilane (Dow Corning XZ–2–2023 silane). The tensile strength of the resulting laminates were 2,678 p.s.i., 2,576 p.s.i. and 2,584 p.s.i.

EXAMPLE V

Following the procedure of Example II but with the exception that the borosilicate glass was cleaned by the procedure of Example III, various additional samples were prepared. These samples were then tested and the results are set forth in the table below.

TABLE.—TENSILE STRENGTHS OF FLUOROCARBON RESIN-GLASS LAMINATES

| Sample: | Average strength, p.s.i. |
|---|---|
| Blank | 225 |
| Uncleaned surface | 450 |
| Wet, clean surface | 1100 |
| 2 hr. dip, R.T. | 1100 |
| 1 hr. reflux, 105° C. | 1700 |
| 4 hr. reflux, 105° C. | 1950 |
| 14 hr. reflux, 105° C. | 2100 |
| Methanol solvent | 575 |

The results of this experiment clearly indicate that there is a substantial improvement in the bonding of fluorocarbon resin to glass by using the coupling agents of the present invention.

EXAMPLE VI

Two sets of standard taper joints of borosilicate glass (Corning Code 7740 Pyrex glass) were cleaned by the procedure of Example III and dried in a furnace at 400° C. for 1 hour. The joints were treated with a 1% solution of Union Carbide A–1100 silane in toluene at a temperature of 60–80° C. for 2 hours and then dried.

The first set was dipped in Teflon TE–3170 aqueous dispersion (small TFE resin particles). Meanwhile, the second set was dipped in Teflon 30 TFE fluorocarbon dispersion (particle size up to 0.5 micron in diameter). Both sets were dried at 120° C. for one half hour and then cured at 400° C. for 1 hour.

The results showed that in each set there was excellent adhesion between the fluorocarbon resin and the glass. These joints maintained their lubricating properties almost indefinitely upon repeated uses.

We claim:
1. A method of bonding a fluorocarbon resin to a durable silicate glass comprising the steps of
   (a) cleaning and drying the glass to leave the surface with free, available silanol groups,
   (b) treating the clean glass surface with a nonaqueous solution of an amino-functional silane coupling agent, the amino group being a primary or secondary amine,
   (c) applying a fluorocarbon resin to the treated glass surface, and
   (d) curing the resin at temperatures below that at which the resin degrades.

2. The method of claim 1, wherein said glass is a member selected from the group consisting of aluminosilicate glass and borosilicate glass.

3. The method of claim 1, wherein said fluorocarbon resin is a member selected from the group consisting of tetrafluoroethylene polymer and fluorinated ethylene-propylene copolymer.

4. The method of claim 3, wherein said fluorocarbon resin is applied in the form of an aqueous dispersion.

5. The method of claim 3, wherein said amino-functional coupling agent is N-beta-aminoethyl-gamma-aminopropyl trimethoxysilane.

6. The method of claim 3, wherein said amino-functional coupling agent is N-beta-aminoethyl-(alpha-methyl-gamma-aminopropyl)-dimethoxymethylsilane.

7. The method of claim 3, wherein said amino-functional coupling agent is gamma-aminopropyl-triethoxysilane.

8. The method of claim 3, wherein said clean glass surface is treated with a 0.1–5.0% by weight of an amino-functional coupling agent in an organic solvent selected from the group consisting of toluene, benzene, xylene and higher boiling hydrocarbons.

9. A product comprising a durable silicate glass and a fluorocarbon resin bonded to the surface of the glass by means of an intermediate amino-functional silane coupling agent the amino group being a primary or secondary amine.

10. The product of claim 9, wherein said glass is a member selected from the group consisting of aluminosilicate glass and borosilicate glass.

11. The product of claim 9, wherein said fluorocarbon resin is a member selected from the group consisting of tetrafluoroethylene polymer and fluorinated ethylene-propylene copolymer.

12. The product of claim 10, wherein said amino-functional coupling agent is N-beta-aminoethyl-gamma-aminopropyl trimethoxysilane.

13. The product of claim 10, wherein said amino-functional coupling agent is N-beta-aminoethyl-(alpha-methyl-gamma-aminopropyl)-dimethoxymethylsilane.

14. The product of claim 10, wherein said amino-functional coupling agent is gamma-aminopropyl-triethoxysilane.

References Cited

UNITED STATES PATENTS

| | | | |
|---|---|---|---|
| 2,971,864 | 2/1961 | Speier | 117—124 |
| 3,398,044 | 8/1968 | Plueddemann | 161—193 |
| 3,398,210 | 8/1968 | Plueddemann et al. | 117—124 X |
| 3,438,801 | 4/1969 | Schlientz et al. | 117—69X |
| 3,461,027 | 8/1969 | Plueddemann | 117—124 X |

ALFRED L. LEAVITT, Primary Examiner

W. F. CYRON, Assistant Examiner

U.S. Cl. X.R.

117—72, 124, 126, 161

Notice of Adverse Decisions in Interferences

In Interference No. 98,075 involving Patent No. 3,558,345, G. Baum and J. G. Koelling, FLUOROCARBON RESIN TO GLASS BONDING, final judgment adverse to the patentee was rendered June 11, 1973, as to claims 9, 10, 11, 12, 13 and 14.

[*Official Gazette September 4, 1973.*]